(12) United States Patent
Bleumer et al.

(10) Patent No.: US 7,724,905 B2
(45) Date of Patent: May 25, 2010

(54) METHOD AND ARRANGEMENT FOR GENERATION OF A SECRET SESSION KEY

(75) Inventors: Gerrit Bleumer, Schildow (DE); Clemens Heinrich, Berlin (DE)

(73) Assignee: Francotyp-Postalia GmbH (DE)

( * ) Notice: Subject to any disclaimer, the term of this patent is extended or adjusted under 35 U.S.C. 154(b) by 1365 days.

(21) Appl. No.: 11/170,641

(22) Filed: Jun. 29, 2005

(65) Prior Publication Data

US 2008/0114982 A1    May 15, 2008

(30) Foreign Application Priority Data

Jul. 1, 2004    (DE) .................. 10 2004 032 057

(51) Int. Cl.
*H04L 9/08* (2006.01)
(52) U.S. Cl. .................. 380/277; 380/260; 380/283
(58) Field of Classification Search .................. 380/259, 380/260, 262, 277, 283, 285, 279, 282; 705/60, 705/401, 405
See application file for complete search history.

(56) References Cited

U.S. PATENT DOCUMENTS 4,956,863 A * 9/1990 Goss .................. 380/30
6,169,804 B1 * 1/2001 Ryan et al. .................. 380/51
2004/0028233 A1 * 2/2004 Meyer et al. .................. 380/277

* cited by examiner

*Primary Examiner*—Kimyen Vu
*Assistant Examiner*—Edward Zee
(74) *Attorney, Agent, or Firm*—Schiff Hardin LLP

(57) ABSTRACT

In a method for generation of a secret session key for cryptographically securing a communication channel between a first communication partner and a second communication partner, the first communication partner generates at least one first key parameter, receives at least one second key parameter generated by the second communication partner, and generates the secret session key using the first key parameter and the second key parameter. The first communication partner generates, stores and communicates to the second communication partner a first random number, receives from the second communication partner a sent-back random number, compares the sent-back random number with the stored random number, and releases the generated secret session key for use given the presence of a predeterminable correlation between the sent-back first random number and the stored random number.

32 Claims, 5 Drawing Sheets

METHOD AND ARRANGEMENT FOR GENERATION OF A SECRET SESSION KEY

BACKGROUND OF THE INVENTION

1. Field of the Invention

The present invention concerns a method for generation of a secret session key for cryptographically securing a communication channel between a first communication partner and a second communication partner of the type wherein the first communication partner generates at least a first key parameter, receives at least one second key parameter generated by the second communication partner, and then generates the secret session key using the first key parameter and the second key parameter. The present invention further concerns an arrangement that is suitable for implementation of such a method.

2. Description of the Prior Art

In a communication between two communication partners, it is frequently necessary to protect the exchanged information from access (in particular from viewing) by unauthorized third parties. This is in particular necessary in the exchange of security-relevant information, for example an invoicing information, in order to prevent unauthorized manipulations or attempts at defrauding.

Such security-relevant or accounting-relevant information is exchanged in a number of fields between different communication partners. The communication partners participating in the information exchange normally are data processing devices that are appropriately designed and/or programmed for the communication. For example, in the field of franking machines it is known to exchange billing information over a communication channel between a franking machine and a remote data center. For example, in systems known as prepaid systems, postage can be loaded into the franking machine via such a communication channel. Secret key information that is used for the generation of the franking imprint can likewise be loaded into the franking machine.

In order to secure the communication between two data processing devices from unauthorized access and unauthorized viewing, the information exchange normally ensues encrypted. Techniques known as symmetrical encryption methods (for example DES, Triple DES, AES etc.) or asymmetrical encryption methods (for example RSA, ElGamal etc.) can be used. Due to the lower expenditure for the encryption and decryption of the information, symmetrical encryption methods generally are preferred for most applications for directly cryptographically securing the communication.

These symmetrical encryption methods require that secret information, for example a secret key, be known to both communication partners, the secret information being used for encryption and decryption. In order to avoid having to exchange the key as a whole between the communication partners, an exchange that would itself have to be protected and secured, methods for key generation of the general type described above are known in which key parameters are exchanged via an unsecured communication channel. These key parameters are then used by the respective communication partners in order to generate the secret key. The method is normally designed such that it is practically impossible to derive the secret session key from the exchanged key parameters with typically available computing power. An example of such a known method is the Diffie-Hellman Key Agreement, as described in U.S. Pat. No. 4,956,863.

To still further increase the security of the information exchange, it may be required to generate a new secret session key after a specific time. Generally, however, a new key is generated for each new communication session between the two communication partners.

These known methods may have the advantage of securing the communication between both communication partners by means of encryption using changing secret session keys. However, they exhibit the disadvantage that, as before, they do not protect against what are known as replay attacks, in which one of the two communication partners is simulated by a third party by replaying recorded old messages exchanged between the two communication partners; the third party thus appears to be the other (legitimate) communication partner. The third party in fact cannot directly attain access to security-relevant data, since as before the secret session key is not known to the third party, but the third party can request unsecured services or information from the communication partner that make a combined attack easier for the third party in order to attain access to security-relevant information.

SUMMARY OF THE INVENTION

An object of the present invention is to provide a method and an arrangement of the initially described type which do not exhibit, or exhibit to a lesser degree, the aforementioned disadvantages, and that in particular provide increased protection against replay attacks.

This object is achieved in accordance with the present invention by a method and apparatus of the type initially described, and wherein first communication partner generates, stores and communicates to the second communication partner a random number; the first communication partner subsequently obtains a random number communicated back from the second communication partner and then compares the random number that was sent back with the stored random number, and releases the generated secret session key for use given the presence of a predeterminable correlation between the random number that was sent back and the stored random number.

In the simplest case, it is checked whether the first random number that was sent back is the same as the stored first random number. Alternatively, a protocol can be used in which the second communication partner modifies the random number according to a predetermined algorithm before it is sent back to the first communication partner.

The introduction of recorded old messages between the two communication partners can be detected in a simple manner by the first communication partner due to the inventive coupling of the release of the secret session key to the random number. This protection is particularly effective against replay attacks in an embodiment of the invention wherein a new secret session key is generated for each new communication session.

If the predetermined correlation between the random number that was sent back and the stored random number does not exist, the first communication partner can react appropriately. For example, the first communication partner can output an error message and may after one or more unsuccessful attempts to obtain the correct random number from the second communication partner—abort the communication.

The first communication partner preferably furthermore transmits the first key parameter to the second communication partner that then likewise generates the secret session key using the first key parameter and the second key parameter.

The coupling of the release of the secret session key to a random number that is described for the first communication partner preferably occurs on both sides. Preferably the second communication partner generates, stores and communicates to the first communication partner a second random number. The second communication partner then obtains a second random number sent back from the first communication partner that it compares with the stored second random number. Given the presence of a predeterminable second correlation between the second random number sent back and the stored second random number, the second communication partner then releases the generated secret session key for use.

The transfer and testing of the first random number and second random number can ensue separately from other communication steps in the framework of the key generation. A coupling with other communication steps, however, in particular communication steps in the generation of the secret session key, preferably ensues in order to make manipulations even more difficult.

For this purpose, in a further embodiment of the inventive method, the first communication partner therefore generates a first dataset and transfers this to the second communication partner. The first dataset thereby contains the first random number and further first data.

This further first data can be a first key generation dataset. This first key generation dataset in turn can include at least the first key parameter, which must be immediately transferred to the second communication partner for generation of the secret session key. In a key generation according to the aforementioned Diffie-Hellman Key Agreement, the first key parameter is, for example, what is known as the public value of the first communication partner.

Additionally or alternatively, the first key generation dataset can include at least one first key generation parameter. The first key generation parameter at least partially defines the method according to which the secret session key is generated. Given a key generation according to the aforementioned Diffie-Hellman Key Agreement, such first key generation parameters are, for example, what is known as the base g and what is known as the prime number (prime) p. The first key generation dataset can even include the entire key generation algorithm.

Additionally or alternatively, the aforementioned further first data can include a first identification of the first communication partner. It is thereby possible for the second communication partner to identify the first communication partner.

The first communication partner preferably initially generates a first digital signature using at least one part of the first dataset and then a second dataset that includes at least the first digital signature, preferably at least the first digital signature and the first dataset. The first communication partner then transmits this second dataset to the second communication partner. On the one hand, the first digital signature enables the second communication partner to check the authenticity of the signed data. In order to preclude manipulations, the signed part of the first dataset includes the first random number. Preferably, the entire first dataset is signed in order to achieve maximal security.

The first digital signature also enables the second communication partner to reliably identify the first communication partner. If, for example, a fixed cryptographic relationship exists between the two communication partners—in other words each is known to the other—and the second communication partner thus has direct access to the information necessary for verification of the first digital signature, a simple name designation or the like of the first communication partner can suffice as the first identification. Using this first identification, the second communication partner can identify the information necessary for verification of the first digital signature, access this information and verify the first digital signature. If the verification is successful, the identity of the first communication partner is simultaneously certain for the second communication partner.

If no fixed cryptographic relationship exists between the two communication partners—in other words, they are not known to one another—the first identification preferably includes all necessary information to enable the second communication partner to make the verification of the first digital signature, for example using cryptographic certificates derived from a common origin (known as a root certification authority) in the hierarchy of a public key infrastructure.

The second communication partner preferably checks the content of the second dataset according to at least one predetermined first testing criterion and proceeds further dependent on the result of the check. The first testing criterion can thereby be contained in the second dataset in order to enable a variable testing adapted to the respective application case. Additionally or alternatively, the second communication partner verifies the first digital signature and proceeds further dependent on the result of the verification.

The first testing criterion, for example, can be one or more specifications with regard to the length, the content and/or the formatting of parts of the second dataset or of the entire second dataset.

If the result of the testing or verification is negative, i.e. it is established that the first testing criterion is not fulfilled, or the verification fails, the second communication partner can react accordingly. For example, the second communication partner can output an error message to the first communication partner and may—after one or more unsuccessful attempts to obtain the correct data from the first communication partner—abort the communication.

In a preferred embodiment of the inventive method, the method proceeds analogously on the part of both communication partners. Thus, after receipt of the first dataset, the second communication partner preferably generates a third dataset and transmits this to the first communication partner. The third dataset preferably includes the last first random number received from the first communication partner or a first random number derived from this according to a predetermined algorithm, as well as a second random number and further second data.

These further second data can be a second key generation dataset that includes at least the second key parameter. The second key generation dataset is preferably designed analogous to the first key generation dataset described above. Additionally or alternatively, the further second data can include a second identification of the second communication partner that enables the first communication partner to identify the second communication partner in a manner analogous to the above description.

Furthermore, the further second data can additionally or alternatively comprise a part of the second dataset. The security of the data exchange is hereby further increased since the first communication partner can check whether the second communication partner has completely obtained the data transmitted to it.

Analogous to the description above, the second communication partner preferably initially generates a second digital signature over at least one part of the third dataset and then generates a fourth dataset that it transmits to the first communication partner. The fourth dataset is structured in a manner analogous to the second dataset described above and includes at least the second digital signature; in particular it includes at least the second digital signature and the third dataset.

Analogous to the method described above on the part of the second communication partner, the first communication partner checks the content of the fourth dataset according to at least one predetermined second testing criterion (that can be contained in the fourth dataset) and proceeds further dependent on the result of the testing. Additionally or alternatively, the first communication partner verifies the second digital signature in an analogous manner and proceeds further dependent on the result of the verification. For example, if the testing or the verification is successful the secret session key is released.

In an embodiment of the inventive method the first communication partner generates a fifth dataset and sends it to the second communication partner after receipt of the third dataset. The fifth dataset includes the second random number last obtained by the second communication partner or a second random number derived therefrom according to a predetermined algorithm. These enable the second communication partner to undertake the testing described above, and release the secret session key.

The fifth dataset furthermore can in turn include an identification of the first communication partner in order to make the origin of the data traceable. Additionally or alternatively, the fifth dataset can include at least one part of the second dataset and/or at least one part of the fourth dataset. This further increases the security of the data exchange since the second communication partner can check whether the first communication partner has completely received the data transmitted to him.

The first communication partner preferably generates a third digital signature using at least a part of the fifth dataset, and generates a sixth dataset that it transmits to the second communication partner. The sixth dataset includes at least the third digital signature, in particular at least the third digital signature and the fifth dataset. In a manner analogous to the method described above, this enables authentication of the transmitted data and a reliable identification of the first communication partner.

Analogous to the method described above, the second communication partner checks the content of the sixth dataset according to at least one predetermined testing criterion. The third testing criterion can be contained in the sixth dataset. The second communication partner then proceeds further dependent on the result of the testing. Additionally or alternatively, the second communication partner verifies the third digital signature and proceeds further dependent on the result of the verification.

The present invention furthermore concerns a method for secure communication in which a secret session key is generated in a first communication step with the inventive method descried above and, in a second communication step subsequent to the first communication step, a communication session between the first communication partner and the second communication partner is cryptographically secured using the secret session key.

The cryptographic securing is independent of the selected method for generation of the secret session key. With the secret session key, both communication partners possess shared secret information which they can use to secure a communication that proceeds according to any method. Depending on degree of need for security or the sensitivity (confidentiality) of the exchanged information, the securing can proceed differently.

If it need only be ensured that manipulation of the exchanged information by third parties do not go undetected, a suitable authentication of the exchanged information using the shared secret information is sufficient. For example, what are known as message authentication codes (for example MACs or HMACs), which are generated on the basis of the exchanged information using the shared secret information and are appended to the exchanged information, are suitable for such an authentication. In contrast to this, should it be desired that the exchanged information not be viewable at all to third parties, for securing the exchanged information encryption methods are suitable in which the information to be exchanged is transformed into a code that cannot be interpreted without knowledge of the shared secret information. Known methods here are, for example, symmetrical algorithms such as DES, Triple DES, AES etc.

The present invention furthermore concerns an arrangement for generation of a secret session key for cryptographically securing a communication channel between a first data processing device and a second data processing device. The arrangement includes a first data processing device that in turn includes a first processing unit that is operable to generate at least one first key parameter. The first data processing device furthermore includes a first communication unit connected with the first processing unit. The first communication unit is operable to receive at least one second key parameter generated by the second data processing device. The first processing unit generates the secret session key using the first key parameter and the second key parameter. The first processing unit also is operable to generate a random number. The first data processing device furthermore has a memory connected with the first processing unit for storage of the random number. Furthermore, the first processing unit is operable to receive (via the first communication unit) a random number sent back by the second data processing device. Finally, the first processing unit is operable to compare the random number that was sent back with the random number stored in the first storage and to release the secret session key given the presence of a predeterminable correlation between the random number that was sent back and the stored random number.

The inventive arrangement is suited for implementation of the inventive method specified above. With it, the advantages and variants described above can be realized in the same manner.

The second data processing device of inventive arrangement preferably includes a second data processing device that comprises a second processing unit and a second communication unit connected with the second processing unit, the second processing unit being operable to generate the second key parameter. The first data processing system is operable to transfer the first key parameter to the second processing unit via the second communication unit. The second processing unit is operable to generate the secret session key using the first key parameter and the second key parameter.

The second processing unit preferably is operable to generate a second random number. The second data processing device then has a second memory connected with the second processing unit to store the second random number. Furthermore, the second processing unit is operable to transfer the second random number to the first data processing device via the second communication unit. The second processing unit is additionally operable to receive a second random number sent back by the first data processing device via the second communication unit. The second processing unit is operable to compare the second random number that was sent back with the second random number that was stored in the second memory and to approve the use of the secret session key given the presence of a predeterminable second correlation between the second random number that was sent back and the stored second random number.

The first processing unit is preferably operable to encrypt messages to the second data processing device using the approved secret session key. Furthermore, the second processing unit preferable is operable to encrypt messages to the first data processing device using the approved secret session key.

The present invention can be used in any field in which information must be exchanged in a secure manner between two communication partners. It can be particularly advantageously used in the field of franking machines. The first data processing device therefore is preferably operable as a franking machine, and the second data processing device is fashioned as a data center disposed remote from the first data processing device. Alternatively, the second data processing device can be fashioned as a franking machine, and the first data processing device is then fashioned as a data center disposed remote from the second data processing device.

The present invention furthermore concerns a data processing device that is fashioned as the first data processing device or as the second data processing device for an inventive arrangement.

DESCRIPTION OF THE PREFERRED EMBODIMENTS

Figure 1:
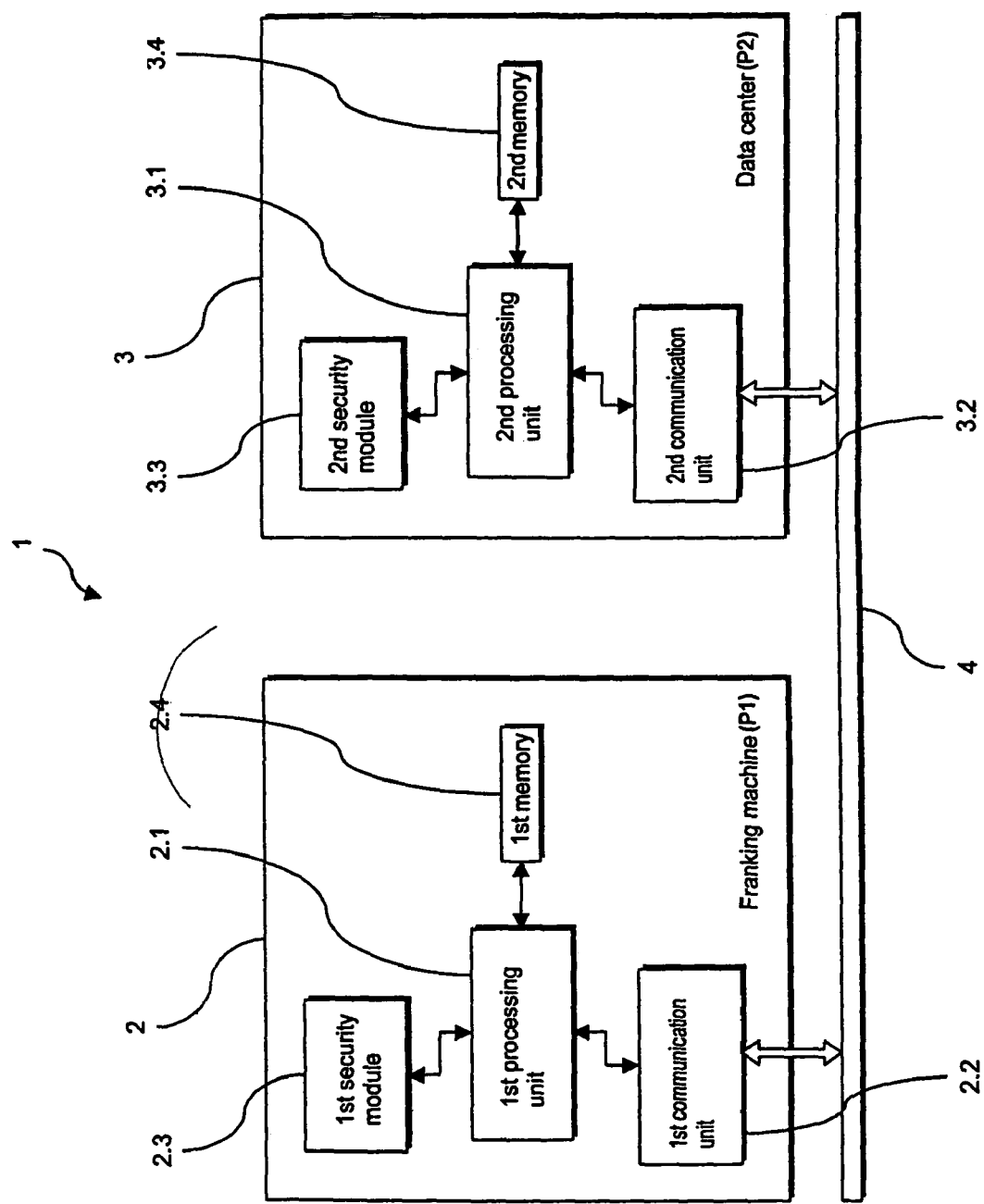
FIG. 1 is a block diagram of a preferred embodiment of the inventive arrangement for implementation of a preferred embodiment of the inventive method for generation of a secret session key and implementation of the inventive method for secure communication.

FIG. 1 is a block diagram of a preferred embodiment of an inventive arrangement 1 for implementation of the inventive method for generation of a secret session key and implementation of the inventive method for secure communication between a first communication partner in the form of a first data processing device and a second communication partner in the form of a second data processing device.

The first data processing device is a franking machine 2 while the second data processing device is a data center 3 arranged remote from the franking machine 2.

The franking machine 2 has a first processing unit 2.1 and a first communication unit in the form of a modem 2.2 connected therewith. Furthermore, the franking machine 2 has a first security module 2.3 connected with the first processing unit 2.1 and a first memory 2.4 connected with the first processing unit 2.1.

The data center 3 has a second processing unit 3.1 and a second communication unit in the form of a modem bank 3.2 connected therewith. Furthermore, the data center 3 has a second security module 2.3 connected with the second processing unit 3.1 and a second memory 3.4 connected with the second processing unit 3.1.

Via a communication network 4, the franking machine 2 can request or invoke specific services from the data center 3 such as, for example, the downloading of postage, etc. For this purpose, it establishes an initially unsecured communication channel with the data center 3 via the first communication unit 2.2, the communication network 4 and the second communication unit 3.2 of the data center 3. It is understood that further franking machines (not shown in FIG. 1), whose design and functionality correspond to that of the franking machine 2, can be connected with the data center 3 via the communication network 4.

In the framework of one or more of the cited services, information that, due to its security relevance or its confidentiality must be protected from unauthorized access by third parties can be exchanged between the franking machine 2 and the data center 3. In order to achieve this, the communication or the communication channel between the franking machine 2 and the data center 3 is secured via cryptographic means, at least upon exchange of critical information.

In the following, the process of a preferred embodiment of the inventive method for secure communication between the franking machine 2 and the data center 3 is described with reference to FIGS. 1 through 5, which includes a preferred embodiment of the inventive method for generation of a secret session key.

The method process is initially started in a step 5.1. In a step 5.2, the first processing unit 2.1 checks whether a new communication should be established with the data center.

If this is the case, in a first communication step 5.3 secret information common to the franking machine 2 and the data center 3 is established in the form of a secret session key SK, which is then used in a subsequent second communication step 5.4 in order to cryptographically secure the communication channel, and thus the contents of communication, between the franking machine 2 and the data center 3.

In the present example, the establishment or generation of the secret session key SK ensues according to the aforementioned Diffie-Hellman Key Agreement. This Diffie-Hellman Key Agreement is sufficiently known and standardized, such that it need not be discussed in detail herein. The algorithms and parameters necessary for this are at least partially stored in the first security module 2.3 or the second security module 3.3. It is understood that other methods for establishment of common secret information can be applied in other variants of the inventive method.

Figure 3:
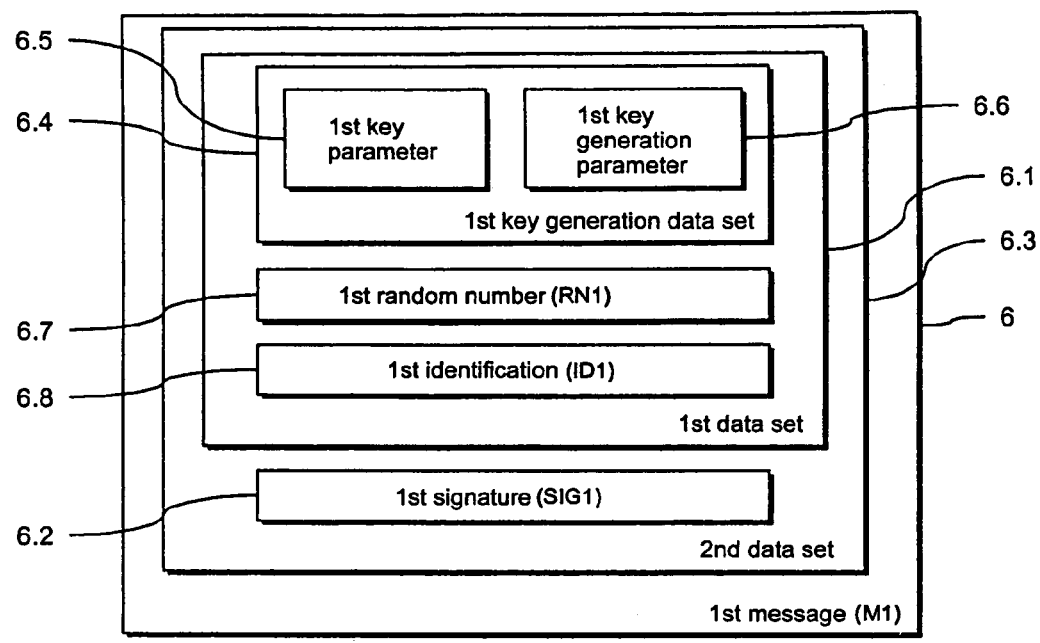
FIG. 3 schematically illustrates a first message that is generated in the method process according to FIGS. 2A and 2B.

To generate the secret session key SK, the franking machine 2 (as a first communication partner P1) initially generates a first message 6 (M1), as it is schematically shown in FIG. 3. This first message 6 includes a first dataset 6.1 generated by the first processing unit 2.1 and a first digital signature 6.2 (SIG1) that are combined by the first processing unit 2.1 into a second dataset 6.3.

The first dataset 6.1 includes a first key generation dataset 6.4. This first key generation dataset 6.4 in turn includes a first key parameter 6.5 and first key generation parameters 6.6.

The first key parameter 6.5 is a parameter that must be transferred to the data center 3 for generation of the secret session key SK. In the present example with the generation of the secret session key SK according to the Diffie-Hellman Key Agreement, the first key parameter 6.5 is accordingly a public value of the franking machine 2 that the first processing unit 2.1 has generated by access to the first security module 2.3 according to the Diffie-Hellman Key Agreement.

The first key generation parameters 6.6 define the method according to which the secret session key SK is generated. Given a key generation according to the Diffie-Hellman Key Agreement, the first key generation parameters 6.6 are a base g and a prime p. These can be varied from time to time as needed in order to increase security.

It will be understood that, in other variants of the inventive method, the first key generation parameters can be known beforehand to both communication partners. Inclusion of the first key generation parameters in the first dataset is then superfluous. It will also be understood that the entire key generation algorithm can be contained in the key generation dataset if necessary. This can be advantageous when a first-time contact occurs between both communication partners and it cannot be assumed that the two communication partners are in possession of the necessary algorithms.

Furthermore, the first dataset 6.1 includes a first random number 6.7 (RN1) that was generated by the first processing unit 2.1 in the step 5.5 and was stored in the first memory 2.4. Furthermore, the first dataset 6.1 includes a first identification 6.8 (ID1) that is associated with the franking machine 2. In the present case, it is the serial number of the franking machine 2, with which the franking machine 2 can be unambiguously identified.

In the step 5.5, with access to the first security module 2.3, the first processing unit 2.1 generates a first digital signature 6.2 (SIG1) using the first dataset 6.1 and according to a known signature algorithm, for example RSA, DSA, ElGamal, ECDSA, etc. It will be understood that the first digital signature (SIG1) alternatively can be generated using only a part of the first dataset in other variants of the inventive method.

In order to generate the first digital signature 6.2 (SIG1), the first processing unit 2.1 accesses a secret first signature key known only to the franking machine 2 and stored in the first security module 2.3. This first signature key is part of a first key pair that also includes a public first verification key. This first verification key is known to the data center 3 and is stored in its second security module 3.3. A second key pair likewise exists for the data center 3, with a secret second signature key and a public second verification key. The second signature key is only known to the data center 3, while the second verification key is also known to the franking machine 2. A fixed cryptographic relationship thus exists between both communication partners franking machine 2 and data center 3. In other words, they are known to one another.

In step 5.5, the first processing unit 2.1 generates the second dataset 6.3 from the first dataset 6.1 and the first digital signature 6.2. This second dataset 6.3 is introduced into the first message 6 (M1) that is communicated to the data center 3 (as a second communication partner P2) via the communication network 4 in a step 5.6.

In a step 5.7, the data center 3 checks the content of the first message 6 (M1), in particular the content of the second dataset 6.3, according to at least one predetermined first testing criterion that, in the present example, is contained in the key generation dataset 6.4.

The communication of the first testing criterion enables a variable testing adapted to the respective application case. It will be understood that, in other variants of the inventive method, the first testing criterion can be stipulated or known beforehand, or can be contained at another location in the first message (M1).

The first testing criterion can be, for example, one or more specifications with regard to the length, the content and/or the formatting of parts of the second dataset 6.3 (for example the first dataset 6.1) or the entire second dataset 6.3.

In addition to the testing, in the step 5.7, the data center 3 verifies the first digital signature 6.2. For this purpose, the second processing unit 3.1 identifies the associated first verification key using the first identification 6.8 (ID1) transmitted with the first message 6 (M1) and accesses the corresponding first verification key stored in the second security module 3.3. Due to the existing fixed cryptographic relationship (explained above) between the franking machine 2 and the data center 3, the simple serial number of the franking machine 2 suffices as a first identification (ID1) for this purpose.

If the verification is successful, in addition to the authenticity of the signed first dataset 6.1, at the same time the identity of the franking machine 2 as a first communication partner (P1) is certain for the data center 3 as a second communication partner (P2).

It will be understood that, in other variants of the inventive method, no such fixed cryptographic relationship exists between both communication partners. In this case, the first identification (ID1) then contains all necessary information in order to enable the second communication partner to make the verification of the first digital signature. This can ensue, for example, in the hierarchy of a public key infrastructure using one or more cryptographic certificates derived from a common origin (known as a root certification authority) that are contained in the first identification (ID1).

In a step 5.8, it is checked whether the result of the testing or verification in step 5.7 was positive, i.e. whether the first testing criterion was fulfilled or the verification was successfully concluded.

If the result of the testing and/or the verification is negative, i.e. it is established that the first testing criterion is not fulfilled or the verification fails, the data center 3 reacts accordingly. Initially it is checked in a step 5.8 whether a predeterminable number of m negative results in a succession exist. If this is not the case, in a step 5.10 a first error message (EM1) is transmitted to the franking machine 2 and the method jumps back to step 5.5. If m negative results in a succession exist, the method jumps to a step 5.11 (see FIG. 2B) and the data center 3 aborts the communication with the franking machine 2.

Figure 4:
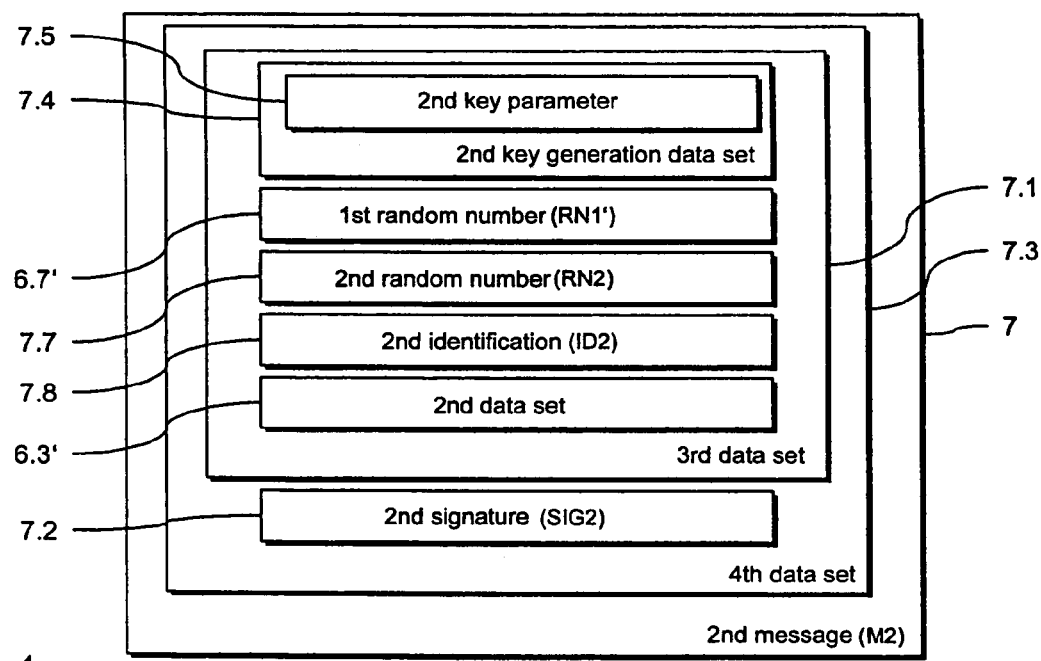
FIG. 4 schematically illustrates a second message that is generated in the method according to FIGS. 2A and 2B.

If the result of the testing and/or the verification is positive, i.e. it is established that the first testing criterion is fulfilled or the verification was successful, in a step 5.12 the data center 3 generates a second message 7 (M2) as schematically shown in FIG. 4. This second message 7 includes a third dataset 7.1 generated by the second processing unit 3.1 and a second digital signature 7.2 (SIG2) that are combined by the second processing unit 3.1 into a fourth dataset 7.3.

The third dataset 7.1 includes a second key generation dataset 7.4. This second key generation dataset 7.4 includes only a second key parameter 7.5 since the key generation parameter 6.6 has already been established beforehand on the part of the franking machine 2. It will be understood that, in other variants of the inventive method, the key generation parameters can be established by the data center 3 or otherwise predetermined, for example by the manufacturer.

The second key parameter 7.5 must be transmitted immediately to the franking machine 2 for generation of the secret session key SK. In the present example with generation of the secret session key SK according to the Diffie-Hellman Key Agreement, the second key parameter 7.5 is the public value of the data center 3, which the second processing unit 3.1 has generated according to the Diffie-Hellman Key Agreement and with access to the second security module 3.3.

The third dataset 7.1 furthermore includes the first random number 6.7' (RN1') lastly transmitted with the first message 6 (M1). The first random number 6.7' (RN') is in unamended form, introduced into the third dataset 7.1. However, with other variants of the invention, it may be modified according to a given scheme. The third dataset 7.1 further comprises a second random number 7.7. (RN2) that was generated by the second processing unit 3.1 in the step 5.12 and stored in the second memory 3.4. Furthermore, the third dataset 7.1 includes a second identification 7.8 (ID2) that is associated with the data center 3 and with which the data center 3 can be unambiguously identified. Finally, the third dataset 7.1 again includes the second dataset 6.3' that is introduced unchanged, or at least one part of the second dataset 6.3'.

In the step 5.12, with access to the second security module 3.3, using the third dataset 7.1 the second processing unit 3.1 generates a second digital signature 7.2 (SIG2) according to a known signature algorithm, for example RSA, DSA, ElGamal, ECDSA etc. Preferably it is the same algorithm that was used for the generation of the first digital signature 6.2 (SIG1). It will also be understood that, in other variants of the inventive method, the second digital signature (SIG2) can be generated using only a part of the third dataset. In order to generate the second digital signature 7.2 (SIG2), the second processing unit 3.1 accesses the second signature key stored in the second security module 3.3.

In step 5.12, the second processing unit 3.1 generates the fourth dataset 7.3 from the third dataset 7.1 and the second digital signature (SIG2). This fourth dataset 7.3 is inserted into the second message 7 (M2) that is transmitted to the franking machine 2 (P1) via the communication network 4.

In a step 5.14, franking machine 2 checks the content of the second message 7 (M2), in particular the content of the fourth dataset 7.3, according to at least one predetermined second testing criterion that preferably corresponds with the first testing criterion.

In addition to the testing, in the step 5.14 the franking machine 2 verifies the second digital signature 7.2 (SIG2). For this purpose, the first processing unit 2.1 identifies the associated second verification key using the second identification 7.8 (ID2) transmitted with the second message (M2) and accesses the corresponding second verification key stored in the first security module 2.3.

It will be understood that, in other variants of the invention without a fixed cryptographic relationship between the communication partners, the second identification again contains all information (for example certificates etc.) that are necessary in order to enable a verification of the second digital signature (SIG2).

If the verification is successful, in addition to the authenticity of the signed second dataset 7.3, the identity of the data center 3 as a second communication partner (P2) is simultaneously certain for the franking machine 2 as a first communication partner (P1).

Using the second dataset 6.3' that has been sent back, the franking machine 2 can additionally check whether the data center 3 received without error all data previously sent in the step 5.6.

Finally, in the step 5.14 it is checked whether the first random number 6.7' (RN1') that was sent back is equal to the first random number 6.7 (RN1) stored in the first memory 2.4. If this is the case, in a simple manner it can be precluded that a replay attack is present by the introduction of a recorded old second message. The second signature 7.2 (SIG2), which among other things was generated via the sent-back first random number 6.7' (RN1'), thereby ensures the authenticity of the sent-back first random number 6.7' (RN1'). Undetected manipulation by simple insertion of a current intercepted first random number 6.7 into a recorded old message is thereby prevented.

In a step 5.15 it is checked whether the result of the testing or verification in step 5.14 was positive, i.e. whether the second testing criterion has been fulfilled, the verification has been successfully concluded, or the sent-back first random number 6.7' (RN1') is equal to the stored first random number 6.7 (RN1).

If the result of one of the tests and/or the verification is negative, i.e. it is established that the second testing criterion is not fulfilled and/or the verification has failed and/or the sent-back first random number 6.7' (RN1') is not equal to the stored first random number 6.7 (RN1), the franking machine 2 reacts accordingly.

In a step 5.16, it is initially checked whether a predeterminable number of n negative results in succession exists. If this is not the case, in a step 5.17 a corresponding second error message (EM2) is transmitted to the data center 3 and the method jumps back to step 5.12. If n negative results in succession exist, the method jumps to the step 5.11 and the franking machine 2 aborts the communication with the data center 3.

If the result of the tests and the verification in step 5.14 is positive, i.e. it is established that the second testing criterion is fulfilled, the verification was successful and the sent-back first random number 6.7' (RN1') is equal to the stored first random number 6.7 (RN1), in a step 5.18 the first processing unit 2.1 generates the secret session key SK with access to the first security module 2.3 and according to the Diffie-Hellman Key Agreement, and simultaneously releases this secret session key SK for use.

In the present example, the release simply ensues by the secret session key SK being generated and written into a accessible storage region of the first security module 2.3. It will be understood that, in other variants of the invention, the secret session key SK can be generated upon each new communication, but is only released upon a positive result of the tests and verification such as by setting a flag or the like.

Figure 5:
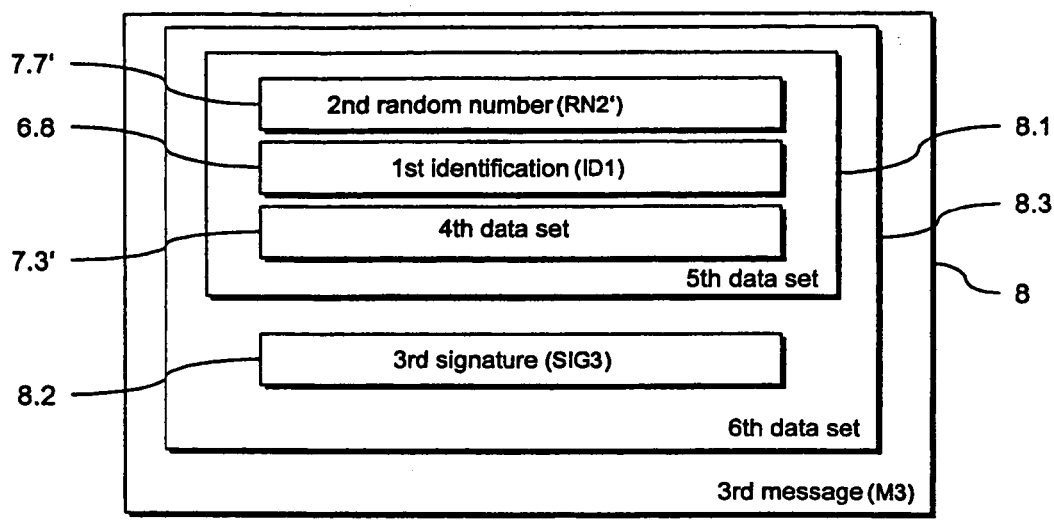
FIG. 5 schematically illustrates a third message that is generated in the method according to FIGS. 2A and 2B.

In a step 5.19, the first processing unit 2.1 generates a third message 8 (M3) as schematically shown in FIG. 5. This third message 8 includes a fifth dataset 8.1 generated by the first processing unit 2.1 and a third digital signature 8.2 (SIG3) that have been combined into a sixth dataset 8.3 by the first processing unit 2.1.

The fifth dataset 8.1 includes the second random number 7.7' (RN2') lastly transmitted with the second message 7 (M2), the lastly transmitted second random number 7.7' (RN2') is used unchanged for this purpose. It furthermore includes the first identification 6.8 (ID1) associated with the franking machine 2, with which the franking machine 2 can be unambiguously identified. The third dataset 8.1 again includes the fourth dataset 7.3' that is likewise used unaltered for this purpose.

In the step 5.19, the first processing unit 2.1 generates a third digital signature 8.2 (SIG3) using the fifth dataset 8.1, with access to the first security module 3.3 and according to a known signature algorithm, for example RSA, DSA, ElGamal, ECDSA etc. It is preferably the same algorithm that has been used for the generation of the first digital signature 6.2 (SIG1). Again it will be understood that, in other variants of the inventive method, the third digital signature (SIG3) can be generated using only a part of the fifth dataset. In order to generate the third digital signature 8.2 (SIG3), the first processing unit 2.1 in turn accesses the first signature key stored in the first security module 2.3.

In the step 5.19, the first processing unit 3.1 generates the sixth dataset 8.3 from the fifth dataset 8.1 and a third digital signature 8.2 (SIG3). This sixth dataset 8.3 is introduced into the third message 8 (M3) that is transmitted to the data center 3 (P2) via the communication network 4 in a step 5.20.

Figure 2A:
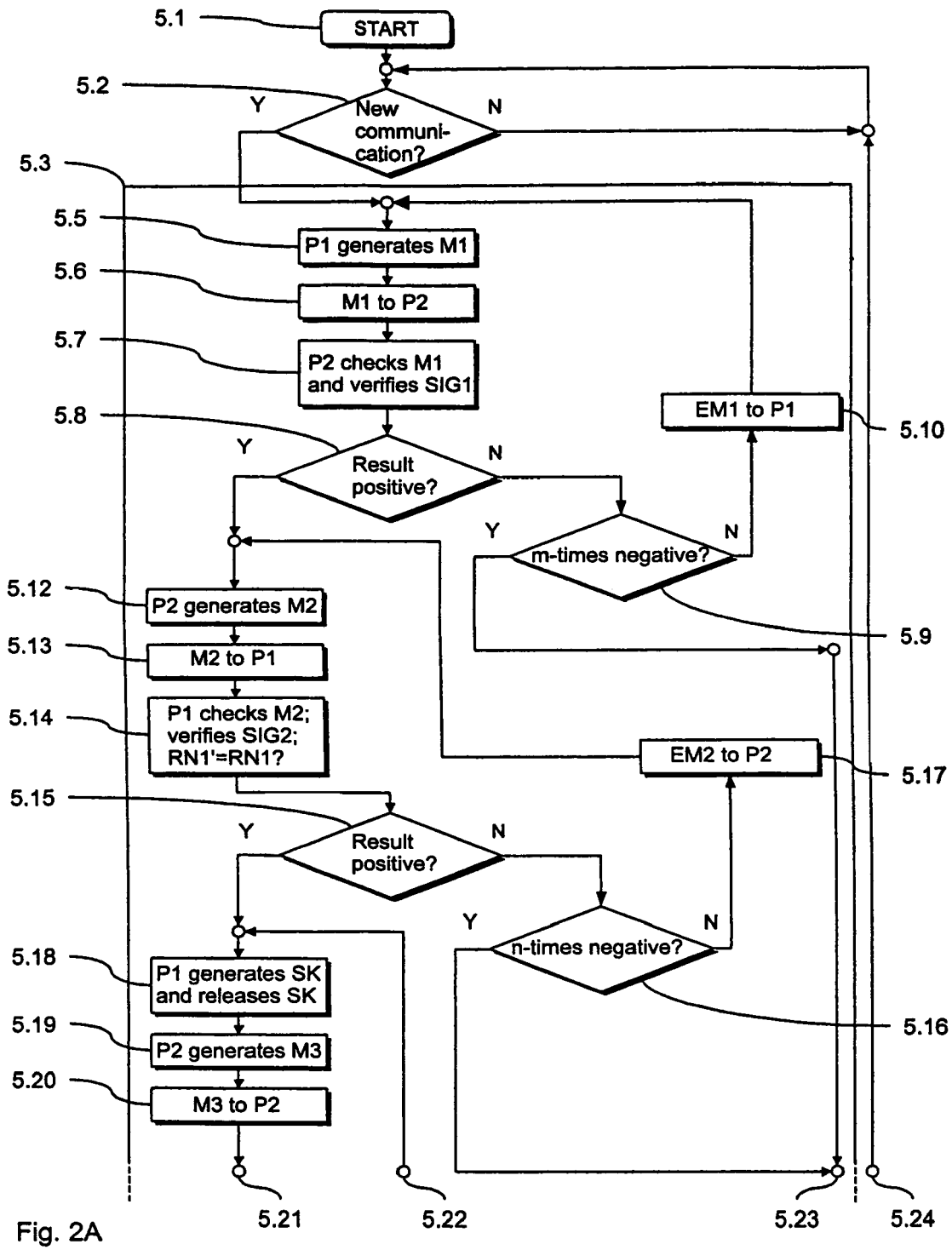
FIGS. 2A and 2B are a flow chart of a preferred embodiment of the inventive method for secure communication that is implemented with the arrangement of FIG. 1.
Figure 2B:
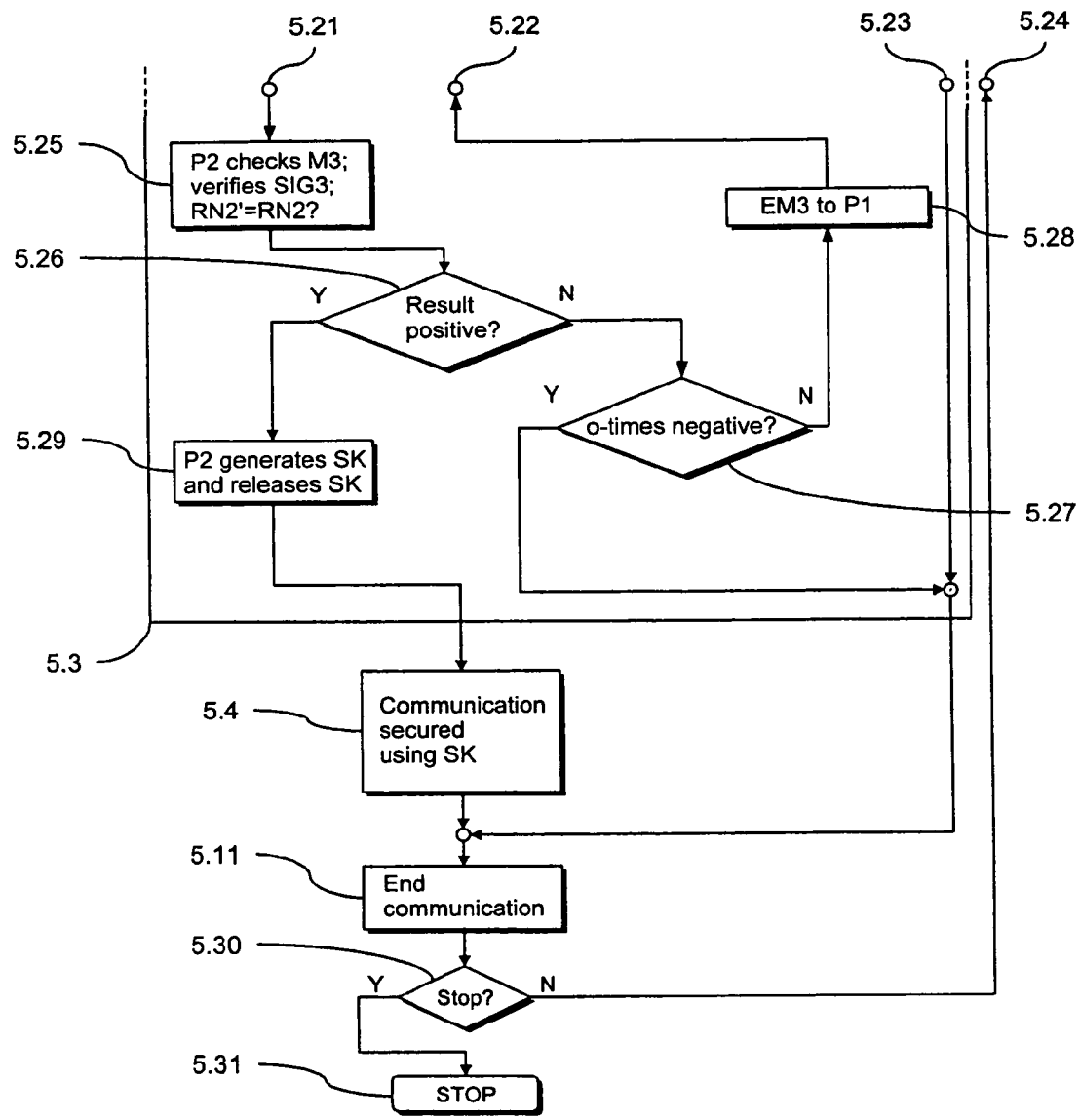

As can be seen from FIG. 2B (whose connection points to FIG. 2A are designated with 5.21 through 5.24), in a step 5.25 the data center 3 checks the content of the third message 8 (M2), in particular the content of the sixth dataset 8.3, according to at least one predetermined third testing criterion that corresponds to the first testing criterion.

In addition to the testing, in the step 5.25 the data center 3 verifies the third digital signature 8.2 (SIG3). For this purpose, the second processing unit 3.1 identifies the associated first verification key using the first identification 6.8 (ID1) transmitted with the third message 8 (M3) and accesses the corresponding second verification key stored in the second security module (3.3).

Finally, in the step 5.25 it is checked whether the sent-back second random number 7.7' (RN2') is equal to the second random number 7.7 (RN2) stored in the second storage 3.4. If this is the case, in a simple manner it can be excluded that a replay attack is present via introduction of a recorded old third message. The third signature 8.2 (SIG3), which among other things was generated using the sent-back second random number 7.7' (RN2'), thereby ensures the authenticity of the sent-back second random number 7.7' (RN2'). Undetected manipulation by simple insertion of a current intercepted second random number 7.7 into a recorded old second message is thereby prevented.

In a step 5.26 it is checked whether the respective result of the testing or verification in step 5.25 was positive, i.e. whether the third testing criterion has been fulfilled, the verification has been successfully concluded or, respectively, the sent-back first random number 7.7' (RN2') is equal to the stored first random number 7.7 (RN2).

If the result of one of the tests and/or the verification is negative, i.e. it is established that the third testing criterion is not fulfilled and/or the verification has failed and/or the sent-back first random number 7.7' (RN2') is not equal to the stored second random number 7.7 (RN2), the data center 3 reacts accordingly.

In a step 5.27, it is initially checked whether a predeterminable number of o negative results in succession exists. If this is not the case, in a step 5.28 a corresponding third error message (EM3) is transmitted to the franking machine 2 and the method jumps back to step 5.18. However, if o negative results in succession exist, the method jumps to the step 5.11 and the data center 3 aborts the communication with the franking machine 2.

If the result of the tests and the verification in step 5.7 is positive, i.e. it is established that the third testing criterion is fulfilled, the verification was successful and the sent-back first random number 7.7' (RN2') is equal to the stored second random number 7.7 (RN2), in a step 5.29 the second processing unit 3.1 generates the secret session key SK with access to the second security module 3.3 and according to the Diffie-Hellman Key Agreement, and simultaneously releases this secret session key SK for use. This proceeds analogously to the generation and release of the secret session key SK by the first processing unit 2.1.

Both communication partners (P1 and P2) are henceforth in possession of the secret session key SK and can conduct a secured communication with usage thereof in the second communication step 5.4. For this purpose, the messages to be exchanged are respectively encrypted using the secret session key SK according to a known symmetrical encryption algorithm, for example DES. The messages to be exchanged are thus not interpretable by third parties that are not in possession of the secret session key SK.

If, for example, all services requested by the franking machine 2 have been implemented by the data center 3, in the step 5.11 the communication between the franking machine 2 and the data center 3 is ended.

Finally, in a step 5.30 it is checked whether the method should be ended. If this is the case, the method process ends in a step 5.31. Otherwise the method jumps back to the step 5.2.

The present invention has been described in the preceding example from the field of franking machines, in which the franking machine represents the first communication partner P1 and the data center represents the second communication partner P2. It will be understood that the roles can be exchanged in other variants of the invention, i.e. the data center can be the first communication partner P1 and the franking machine can be the second communication partner P2.

It will also be understood that the inventive method and devices can be used in the field of communication between other types of data processing devices in which securing of a communication from unauthorized access by third parties should ensue.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for cryptographically securing a communication between a first computerized communication partner and a second computerized communication partner, comprising the steps of:
   by a processing unit of said first communication partner, generating a first key parameter;
   receiving at least one second key parameter at said first communication partner generated by said second communication partner;
   by the processing unit of said first communication partner, generating a secret session key using said first key parameter and said second key parameter;
   by the processing unit of said first communication partner, generating and storing a random number, and communicating said random number from said first communication partner to said second communication partner;
   at said first communication partner, receiving a sent-back random number from said second communication partner; and
   by the processing unit of said first communication partner, comparing said sent-back random number with the stored random number and releasing said secret session key for use upon satisfaction of a predetermined correlation between the sent-back random number and the stored random number.

2. A method as claimed in claim 1 comprising:
   transmitting said first key parameter from said first communication partner to said second communication partner; and
   at said second communication partner, generating said secret session key using said first key parameter and said second key parameter.

3. A method as claimed in claim 2 wherein said random number is a first random number, and comprising:
   at said second communication partner, generating and storing a second random number and communicating said second random number from said second communication partner to said first communication partner;
   at said second communication partner, receiving a sent-back second random number from said first communication partner; and
   at said second communication partner, comparing said sent-back second random number with the stored second random number and releasing said secret session key for use upon satisfaction of a predetermined correlation between the sent-back second random number and the stored second random number.

4. A method as claimed in claim 1 comprising:
   at said first communication partner, generating a dataset comprising said random number and a key generation dataset; and
   transmitting said dataset from said first communication partner to said second communication partner.

5. A method as claimed in claim 4 comprising, at said first communication partner, generating said key generation dataset comprising at least one of said first key parameter and a key generation parameter.

6. A method as claimed in claim 4 wherein said dataset is a first dataset, and comprising:
   at said first communication partner, generating a digital signature using at least a portion of said first dataset;
   at said first communication partner, generating a second dataset comprising at least said digital signature; and
   transmitting said second dataset to said second communication partner.

7. A method as claimed in claim 6 comprising:
   at said first communication partner, including a testing criterion in said second dataset; and
   at said second communication partner, performing at least one of:
      checking the contents of said second dataset according to said testing criterion to obtain a test result, and taking further action at said second communication partner dependent on said test result, and
      verifying said digital signature to obtain a verification result, and taking further action at said second communication partner dependent on said verification result.

8. A method as claimed in claim 7 wherein said random number is a first random number, said key generation dataset is a first key generation dataset, and said key parameter is a first key parameter, comprising:
   at said second communication partner, generating a third dataset after receipt of at least said first dataset from said first communication partner, comprising a first random number lastly received from said first communication partner, a second random number, and a second key generation dataset comprising at least one of a second key parameter, an identification of said second communication partner, or at least a part of said second dataset; and
   transmitting said third dataset from said second communication perkier to said first communication partner.

9. A method as claimed in claim 8 comprising, at said second communication partner, including in said second key generation dataset at least one of said second key parameter and a second key generation parameter.

10. A method as claimed in claim 9 wherein said digital signature is a first digital signature, and comprising:
   at said second communication partner, generating a second digital signature using at least a part of said third dataset;
   generating a fourth dataset comprising at east said second digital signature; and
   transmitting said fourth dataset from said second communication perkier to said first communication perkier.

11. A method as claimed in claim 10 wherein said testing criterion is a first testing criterion, and comprising:
   at said second communication partner, including a predetermined second testing criterion in said second dataset and
   at said first communication perkier, performing at least one of:
      checking the contents of said fourth dataset according to said second testing criterion to obtain a test result, and taking further action at said first communication partner dependent on said test result, and
      verifying said second digital signature to obtain a verification result, and taking further action at said first communication partner dependent on said verification result.

12. A method as claimed in claim 11 comprising:
   at said first communication partner, generating a fifth dataset after receipt of said third dataset, comprising a second random number lastly received from said second communication partner, and an identification of said first communication partner, and at least one of a part of said second dataset or at least a part of said fourth dataset; and
   transmitting said fifth dataset from said first communication partner to said second communication partner.

13. A method as claimed in claim 12 comprising:
   at said first communication partner, generating a third digital signature using at least a part of said fifth dataset;
   generating a sixth dataset comprising at least said third digital signature; and
   transmitting said sixth dataset from said first communication partner to said second communication partner.

14. A method as claimed in claim 13 comprising:
   at said first communication partner, including a third predetermined testing criterion in said sixth dataset; and
   at said second communication partner, performing at least one of:
      checking the contents of said sixth dataset according to said third testing criterion to obtain a test result, and taking further action at said second communication partner dependent on said test result, and
      verifying said third digital signature to obtain a verification result, and taking further action at said second communication partner dependent on said verification result.

15. A method as claimed in claim 1 comprising conducting a communication session between said first communication partner and said second communication partner that is cryptographically secured using said secret session key.

16. An arrangement for cryptographically securing a communication between a first data processing device and a second data processing device, comprising:
   said first data processing device comprising a processing unit that generates a first key parameter;
   a communication unit at said first data processing device, connected to said processing unit, that receives at least one second key parameter generated by said second data processing device;
   said processing unit, generating a secret session key using said first key parameter and said second key parameter;
   said processing unit generating and a random number and said first data processing device comprising a memory, connected to said processing unit, in which said random number is stored, and said communication unit communicating said random number from said first data processing device to said second data processing device;
   said communication unit receiving a sent-back random number from said second data processing device; and
   said processing unit comparing said sent-back random number with the stored random number and releasing said secret session key for use upon satisfaction of a predetermined correlation between the sent-back random number and the stored random number.

17. An arrangement as claimed in claim 16 wherein said processing unit is a first processing unit, and comprising:
   said communication unit transmitting said first key parameter from said first data processing device to said second data processing device; and said second data processing device comprising a second processing unit that generates said secret session key using said first key parameter and said second key parameter.

18. An arrangement as claimed in claim 17 wherein said random number is a first random number, said communication unit is a first communication unit, and said memory is a first memory, and comprising:
said second processing unit generating a second random number and said second data processing device comprising a second memory in which said second random number is stored, and said second data processing device comprising a second communication unit that communicates said second random number from said second data processing device to said first data processing device;
said second communication unit receiving a sent-back second random number from said first data processing device; and
said second processing unit comparing said sent-back second random number with the stored second random number and releasing said secret session key for use upon satisfaction of a predetermined correlation between the sent-back second random number and the stored second random number.

19. An arrangement as claimed in claim 16 comprising:
said processing unit generating a dataset comprising said random number and a key generation dataset; and
said communication unit transmitting said dataset from said first data processing device to said second data processing device.

20. An arrangement as claimed in claim 19 wherein said processing unit generates said key generation dataset comprising at least one of said key parameter and a key generation parameter.

21. An arrangement as claimed in claim 19 wherein said dataset is a first dataset, and comprising:
said processing unit generates a digital signature using at least a portion of said first dataset;
said processing unit generates a second dataset comprising at least said digital signature; and
said communication unit transmits said second dataset to said second data processing device.

22. An arrangement as claimed in claim 21 wherein said processing unit is a first processing unit, and comprising:
said first processing unit including a testing criterion in said second dataset; and
said second data processing device comprising a second processing unit performing at least one of:
checking the contents of said second dataset according to said testing criterion to obtain a test result, and causing further action to be taken at said second data processing device dependent on said test results, and
verifying said digital signature to obtain a verification result, and causing further action to be taken at said second data processing device dependent on said verification result.

23. An arrangement as claimed in claim 22 wherein said random number is a first random number, said key generation dataset is a first key generation dataset, and said communication unit is a first communication unit, and said key parameter is a first key parameter, comprising:
said second processing unit generating a third dataset after receipt of at least said first dataset from said first data processing device, comprising a first random number lastly received from said first data processing device, a second random number, and a second key generation dataset comprising at least one of a second key parameter, an identification of said data processing device partner, or at least a part of said second dataset; and
said second data processing device comprising a second communication unit that transmits said third dataset from said second data processing device to said first data processing device.

24. An arrangement as claimed in claim 23 wherein said second processing unit includes in said second key generation set at least one of said second key parameter and a second key generation parameter.

25. An arrangement as claimed in claim 24 wherein said digital signature is a first digital signature, and comprising:
said second processing unit generating a second digital signature using at least a part of said third dataset;
said second processing unit generating a fourth dataset comprising at least said second digital signature; and
said second communication unit transmitting said fourth dataset from said second data processing device to said first data processing device.

26. An arrangement as claimed in claim 25 wherein said testing criterion is a first testing criterion, and comprising:
said second processing unit including a predetermined second testing criterion in said second dataset; and
said first processing performing at least one of:
checking the contents of said fourth dataset according to said second testing criterion to obtain a test result and causing further action to be taken at said first data processing device dependent on said test result, and
verifying said second digital signature to obtain a verification result and causing further action to be taken at said first data processing device dependent on said verification result.

27. An arrangement as claimed in claim 26 comprising:
said first processing unit generating a fifth dataset after receipt of said third dataset, comprising a second random number lastly received from said second data processing device, and an identification of said first data processing device, and at least one of a part of said second dataset and at least a part of said fourth dataset; and
said first communication unit transmitting said fifth dataset from said first data processing device to said second data processing device.

28. An arrangement as claimed in claim 27 comprising:
said first processing unit generating a third digital signature using at least a part of said fifth dataset;
said first processing unit generating a sixth dataset comprising at least said third digital signature; and
said first communication unit transmitting said sixth dataset from said first data processing device to said second data processing device.

29. An arrangement as claimed in claim 28 comprising:
said first processing unit including a third predetermined testing criterion in said sixth dataset; and
said second processing unit performs at least one of:
checking the contents of said sixth dataset according to said third testing criterion to obtain a test result and causing further action to be taken at said second data processing device dependent on said test result, and
verifying said third digital signature to obtain a verification result and causing further action to be taken at said second data processing device dependent on said verification result.

30. An arrangement as claimed in claim 16 wherein said communication unit is a first communication unit and wherein said second data processing device comprises a second communication unit, and wherein said first data processing device and said second data processing device conduct a communication session via said first and second communication units that is cryptographically secured using said secret session key.

31. An arrangement as claimed in claim 16 wherein said first data processing device is a franking machine and said second data processing device is a data center remote from said franking machine.

32. An arrangement as claimed in claim 16 wherein said second data processing device is a franking machine and said first data processing device is a data center remote from said franking machine.

* * * * *